United States Patent
Mori et al.

(10) Patent No.: US 8,591,111 B2
(45) Date of Patent: Nov. 26, 2013

(54) SIDE SEAL FOR LINEAR MOTION GUIDE UNIT

(75) Inventors: Junya Mori, Mino (JP); Kenjiro Nishiwaki, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 427 days.

(21) Appl. No.: 13/085,596

(22) Filed: Apr. 13, 2011

(65) Prior Publication Data

US 2011/0254233 A1    Oct. 20, 2011

(30) Foreign Application Priority Data

Apr. 16, 2010   (JP) .................................. 2010-095275

(51) Int. Cl.
*F16C 33/10*   (2006.01)

(52) U.S. Cl.
USPC .......................................................... 384/13

(58) Field of Classification Search
USPC ................................................ 384/13, 43–45
See application file for complete search history.

(56) References Cited

U.S. PATENT DOCUMENTS

| | | | | |
|---|---|---|---|---|
| 4,886,374 A * | 12/1989 | Osawa | ............................. | 384/13 |
| 5,435,649 A * | 7/1995 | Kuwahara | ........................ | 384/13 |
| 5,695,288 A * | 12/1997 | Sugihara et al. | ................ | 384/13 |
| 7,146,870 B2 * | 12/2006 | Kuo et al. | ........................ | 384/45 |
| 2010/0002965 A1 * | 1/2010 | Kondo | ............................. | 384/13 |

FOREIGN PATENT DOCUMENTS

JP   2000-120989 A   4/2000

* cited by examiner

*Primary Examiner* — Thomas R Hannon
(74) *Attorney, Agent, or Firm* — Ladas & Parry LLP

(57) ABSTRACT

The need for a related-art nipple 3 is eliminated to lift restriction on the stroke of the slider S. A tubular protrusion 9 is provided on the face of a seal body H facing an end cap C, and maintains a positional relationship of being inserted into a lubricant supply hole 8 formed in the end cap when the face of the seal body faces the face of the end cap, and it has an insertion portion 9a receiving insertion of a lubricant supply nozzle 10 for a supply of lubricant, and a supply port 9b connected to a rolling-element directing passage 7 via the lubricant supply hole when it is inserted into the lubricant supply hole. A seal element is created on the insertion portion 9a and makes close contact with the lubricant supply nozzle in a process of inserting the lubricant supply nozzle into the insertion portion.

4 Claims, 5 Drawing Sheets

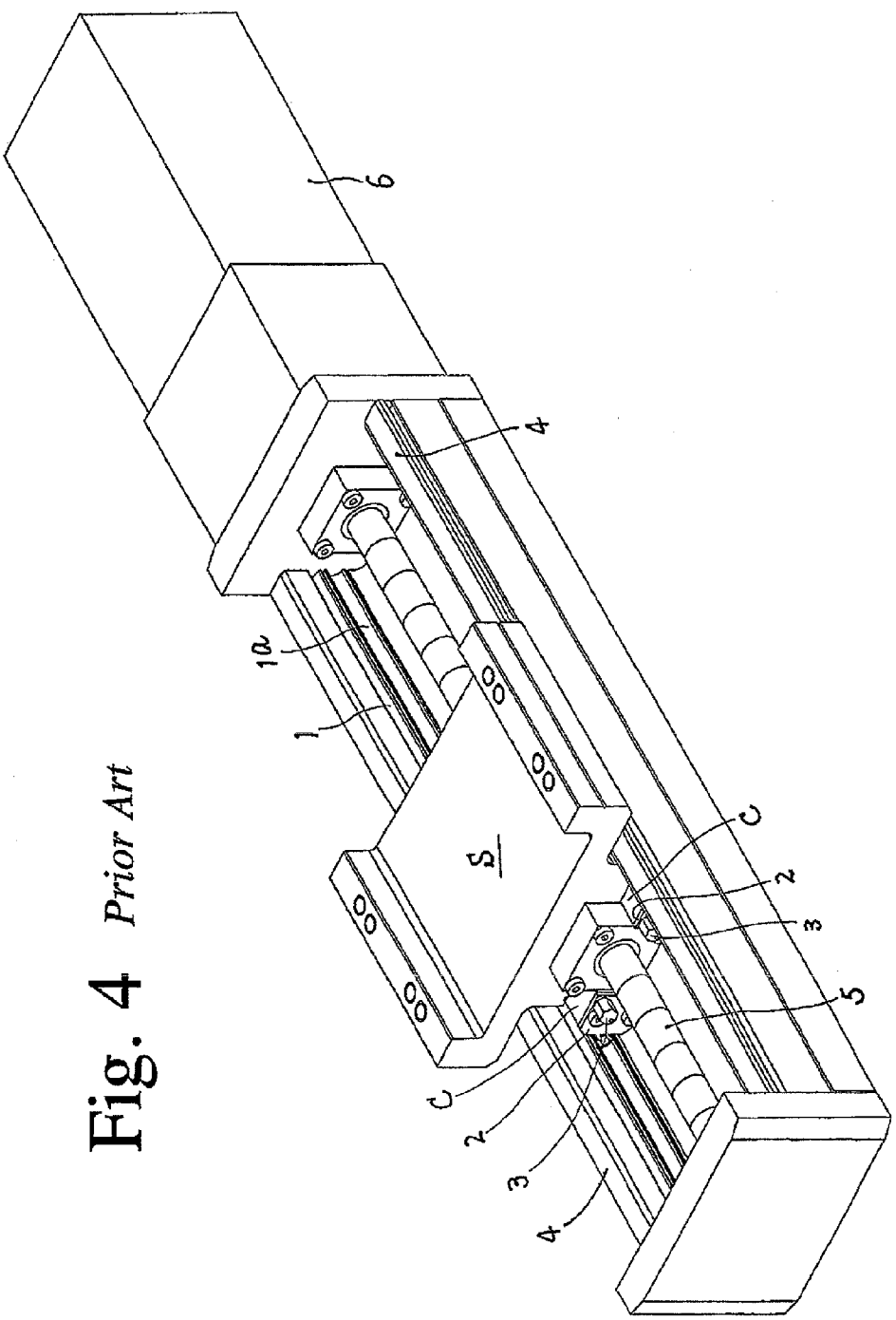
Fig. 4  *Prior Art*

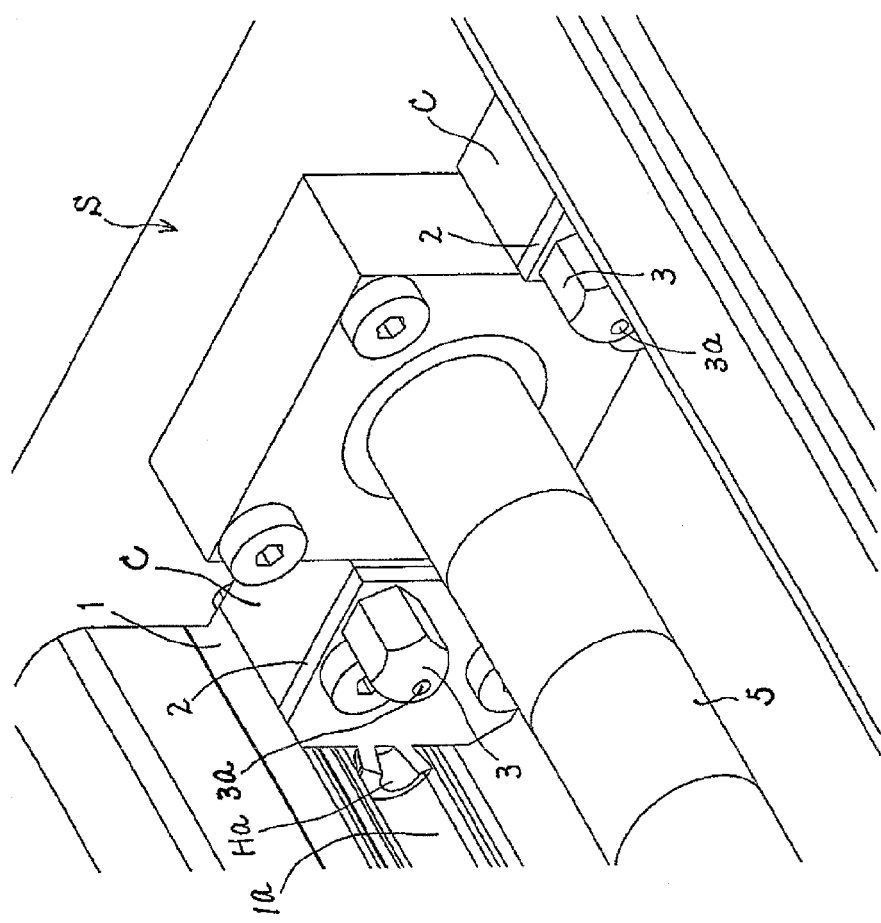
Fig. 5  *Prior Art*

SIDE SEAL FOR LINEAR MOTION GUIDE UNIT

BACKGROUND OF THE INVENTION

1. Field of the Invention

This invention relates to a side seal used in a linear motion guide unit which moves along rails.

2. Description of the Related Art

As shown in FIG. 5, a side seal used in such a well-known type of liner motion guide unit is formed of a combination of a metal-made plate and a rubber-made elastic material baked onto the surface thereof. The side seal includes a seal lip Ha making contact with the track surface of the rail, and is provided for preventing the intrusion of foreign substances and the like into a slider while the slider moves on the rail with the rotation of a drive shaft 5 formed of a screw. End caps C are attached to each of the opposite ends of the slider S in the moving direction of the slider S moving along the rails 1. A seal body 2 of the side seal is attached to the outer face of each of the end caps C, i.e., the face opposite to the contact face of the end cap C with the slider S.

The slider S is equipped with guide passages (not shown) and a plurality of rolling elements such as balls, rollers or the like (not shown) is mounted in the guide passages in such a manner as to be able to roll therein. Each of the guide passages extends endlessly by the interposition of rolling-element directing passages which are respectively provided in the end caps C on the opposite ends of the slider S, and thereby the rolling elements roll along a raceway 1a formed on the rail 1 while being guided by the guide passage. In the process of the rolling elements rolling on the raceway 1a of the rail 1 in this manner, the bearing function is implemented to achieve smooth movement of the slider S.

The end cap C has a lubricant supply port formed therein, and the seal body 2 has a supply port formed therein to be fluidly connected to the lubricant supply port. As shown in FIG. 4, such a supply port is covered with a grease nipple 3. The grease nipple 3 protrudes outward in the axis direction which is the moving direction of the slider S.

Such a grease nipple 3 has a ball 3a covering the supply port. The ball 3a functions as a check valve that permits lubricant flow for supply only in one direction from the lubricant supply nozzle toward the lubricant supply port. Accordingly, when the lubricant supply nozzle is pressed against the supply port for lubricant supply, a supply pressure is produced and retracts the ball 3a from its home position, so that the lubricant is introduced to the rolling-element directing passage via the lubricant supply port.

After the lubricant has been adequately supplied to the rolling-element directing passage, the lubricant supply nozzle is removed from the supply port, whereupon the supply port is covered again with the ball, so that foreign substances are prevented from entering from the supply port.

A structure as described above is described in Japanese Patent Laid-open No. 2000-120989.

A related-art side seal designed as described above has a grease nipple 3 protruding in the moving direction of the slider S, so that the stroke of the slider S is restricted by the length of the protrusion of the grease nipple 3. In particular, the linear motion guide units have been increasingly reduced in size in recent years. The more the size of the linear motion guide unit is reduced, the higher the ratio of the protrusion length of the grease nipple 3 to the stroke of the slider S. This produces the disadvantage that the stroke of the slider S is relatively restricted.

The related-art side seal needs the grease nipple 3 as described above. This gives rise to disadvantages of an increase in component count and an increase in cost.

In addition, since the grease nipple needs a ball for covering the supply port and a spring for pressing the ball against the supply port, the structure of the grease nipple itself is complicated, which is one factor responsible for the increased cost.

Precise fitting and close contact of the lubricant supply nozzle to the lubricant supply port of the grease nipple are required for the use of the lubricant supply nozzle to supply the lubricant to the lubricant supply port of the grease nipple without leakage. However, since the site where the grease nipple is mounted is located in an area that does not allow allocation of enough room for mounting the grease nipple, it is not easy to precisely press the leading end of the lubricant supply nozzle against the lubricant supply port of the grease nipple without misalignment, for the supply of lubricant without lubricant leakage.

SUMMARY OF THE INVENTION

The present invention is based on a side seal for a linear motion guide unit including a seal body that is provided on the outer side of an end cap mounted on each of the opposite ends of a slider and has a supply port formed therein for a supply of lubricant to a rolling-element directing passage formed in the corresponding end cap.

In a first aspect of the present invention a tubular protrusion is provided on a side face of the seal body facing the end cap. The tubular protrusion maintains a positional relationship of being inserted into a lubricant supply hole formed in the end cap when the side face of the seal body faces a side face of the end cap. The tubular protrusion comprises an insertion portion receiving insertion of a lubricant supply nozzle used for a supply of lubricant, and a supply port connected to the rolling-element directing passage through the lubricant supply hole in a condition in which the tubular protrusion is inserted in the lubricant supply hole. A seal element is created on the insertion portion and makes close contact with an outer periphery of the lubricant supply nozzle in a process of inserting the lubricant supply nozzle into the insertion portion.

In a second aspect of the present invention the tubular protrusion has an outer diameter smaller than an inner diameter of a portion of the lubricant supply hole of the end cap into which the tubular protrusion is inserted, in order to create clearance.

In a third aspect based on either the first or the second aspect, the insertion portion of the tubular protrusion into which the lubricant supply nozzle is inserted has an inner diameter tapered from an end of the insertion portion opposite to a contact face with the slider toward the lubricant supply hole.

According to the first aspect, by inserting a lubricant supply nozzle into the insertion portion of the tubular protrusion, the outer periphery of the lubricant supply nozzle comes into contact with the insertion portion to create the seal element. Accordingly, even when the lubricant is forcibly supplied from the reduced-diameter supply port of the tubular protrusion to thereby increase the pressure, this lubricant supplied at high pressure does not leak from the outer periphery of the lubricant supply nozzle. In other words, if the supply port is reduced in size to the extent that the intrusion of foreign substances is prevented, a sufficient amount of lubricant can be supplied by applying a high pressure.

In this manner, the size of the supply port can be reduced to the extent that the intrusion of foreign substances can be prevented.

In addition, since the tubular protrusion with the supply port maintains the positional relationship of being inserted into the lubricant supply hole formed in the end cap in the condition in which one of the side faces of the seal body faces the side face of the end cap, the tubular protrusion does not protrude in the moving direction of the slider.

In this manner, since the tubular protrusion does not protrude in the moving direction of the slider, the moving stroke of the slider is not restricted.

According to the second aspect, the outer diameter of the tubular protrusion is smaller than the inner diameter of a portion of the lubricant supply hole of the end cap into which the tubular protrusion is inserted, thus creating clearance. This allows the tubular protrusion to expand outward within the lubricant supply hole. Since the tubular protrusion can expand outward within the lubricant supply hole in this manner, for example, if the lubricant supply nozzle is inserted into the insertion portion of the tubular protrusion and then the nozzle is tilted, the tubular protrusion can be expanded outward while the leading end of the nozzle strongly presses against the inner side of the insertion portion. In other words, even if the lubricant supply nozzle is inserted at an angle into the insertion portion, this does not affect the supply of lubricant.

According to the third aspect, the inner periphery of the tubular protrusion is tapered toward the leading end, so that the outer open end of the tubular protrusion has a relatively larger diameter, thus facilitating insertion of the lubricant supply nozzle into the insertion portion. Further, when the lubricant supply nozzle is inserted into the insertion portion, the outer periphery of the lubricant supply nozzle comes into contact with the inner periphery of the insertion portion. Accordingly, although the lubricant is supplied at high pressure, the lubricant does not leak from the seal element.

BRIEF DESCRIPTION OF THE DRAWINGS

FIG. 4 is a perspective view of a linear motion guide unit using a related art side seal.

FIG. 5 is an enlarged perspective view of the side seal attached to the linear motion guide unit in FIG. 4.

DETAILED DESCRIPTION OF THE INVENTION

Figure 1:
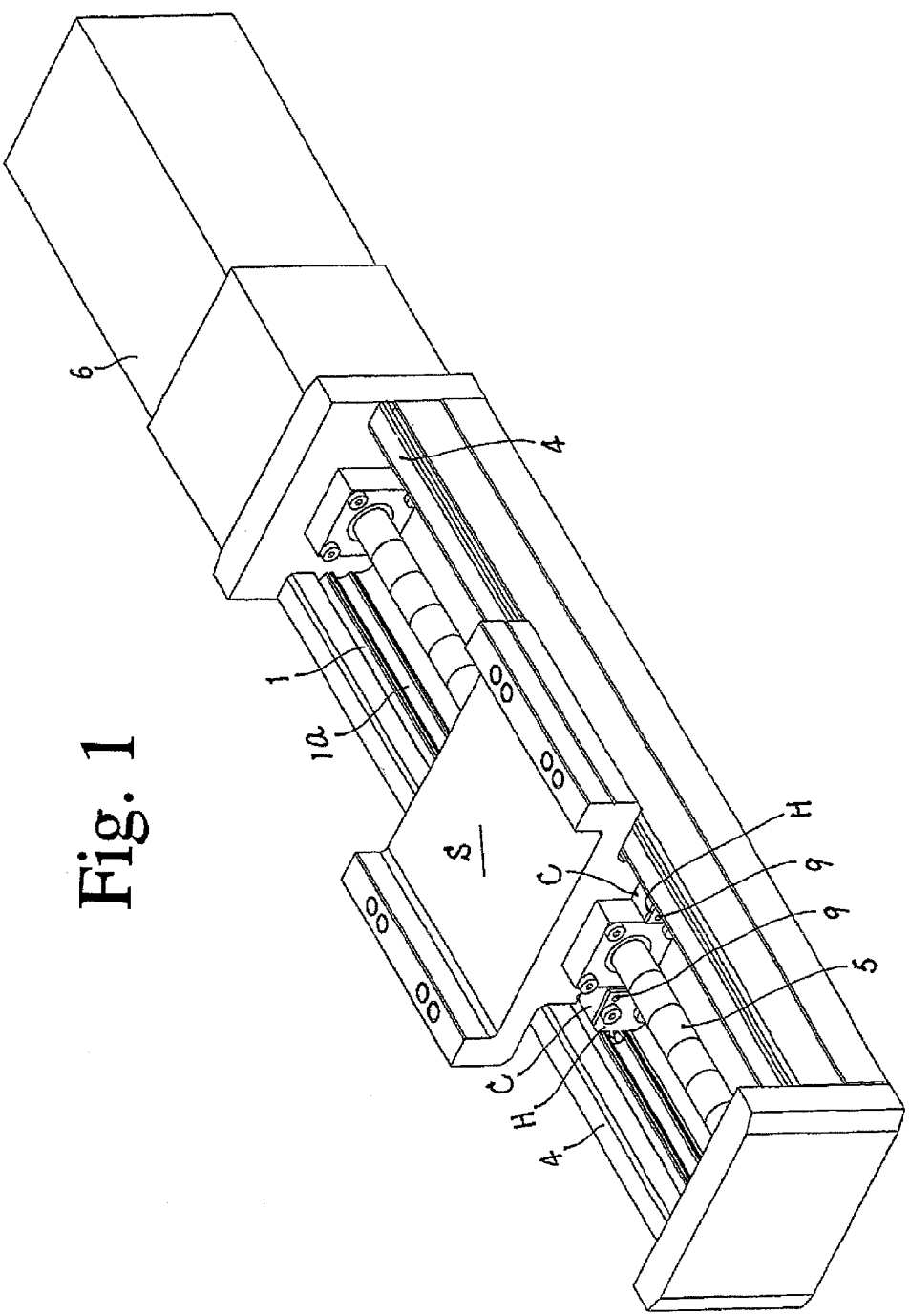
FIG. 1 is a perspective view of a linear motion guide unit using a side seal according to the present invention.
Figure 2:
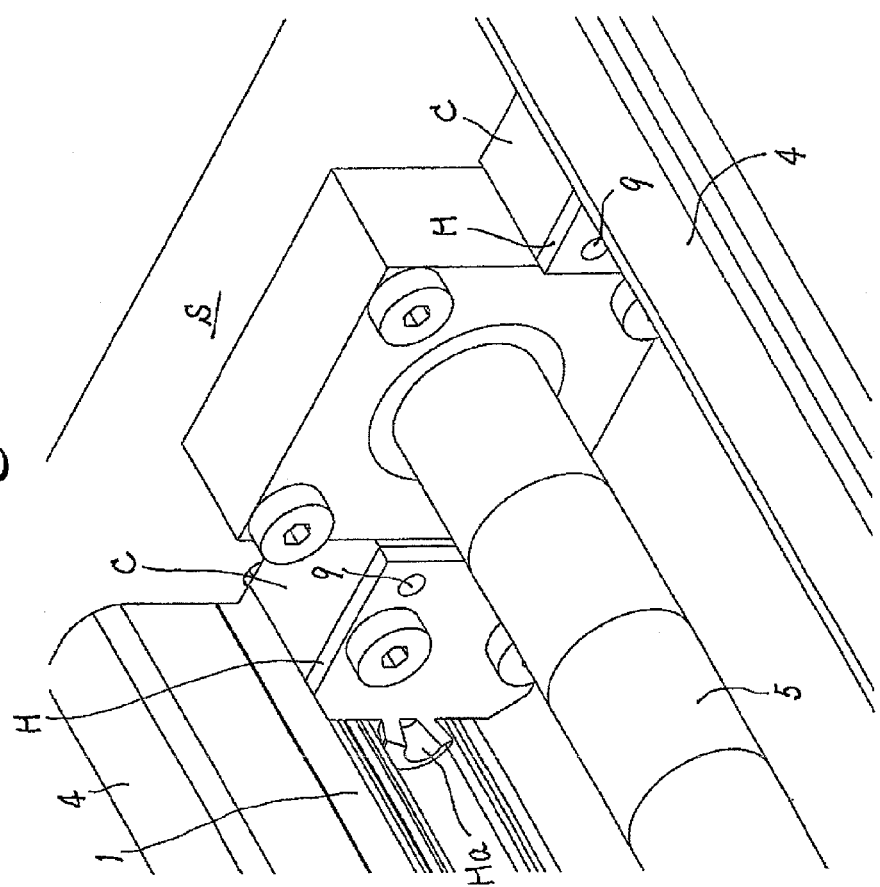
FIG. 2 is an enlarged perspective view of the side seal attached to the linear motion guide unit in FIG. 1.
Figure 3:
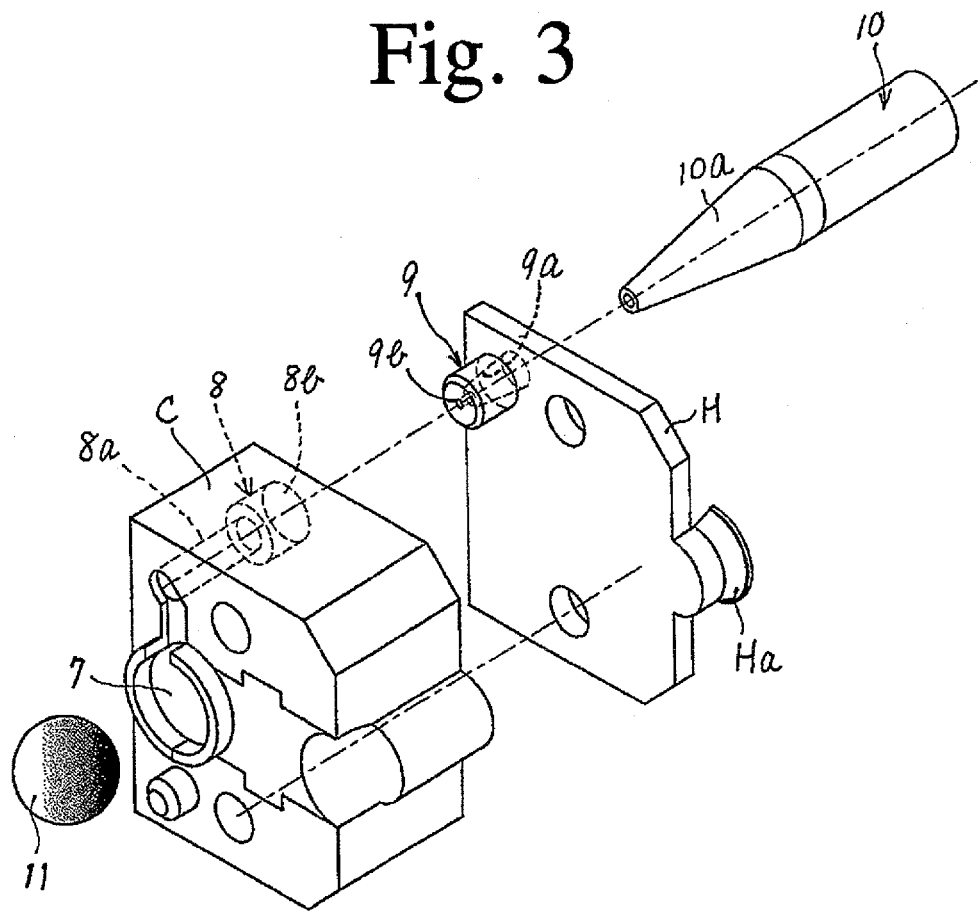
FIG. 3 is an enlarged perspective view showing the interrelationship of the side seal, the end cap and a lubricant supply nozzle.

In a linear motion guide unit according to an embodiment illustrated in FIGS. 1 to 3, rails 1 having raceways 1a similar to those in the related art are respectively mounted on the inner surfaces of a pair of side walls 4.

A slider S is fitted between the rails 1 so as to be capable of sliding thereon. The slider S moves with the rotation of the drive shaft 5 formed of a screw while being guided by the rails 1.

In this regard, FIG. 1 shows an electric motor 6 provided for rotating the drive shaft 5.

The slider S moving along the rails 1 has opposite ends in the moving direction, and end caps C are mounted on each of the opposite ends. A seal body H of the side seal according to the present invention is mounted on the outer face of each of the end caps C, that is, the face opposite to the contact face of the end cap C with the slider S.

The slider S is equipped with guide passages (not shown). A plurality of rolling elements such as balls, rollers or the like (not shown) is mounted in the guide passages in such a manner as to be able to roll therein. Each of the guide passages extends endlessly by the interposition of rolling-element directing passages 7 (see FIG. 3) respectively provided in the end caps C. The rolling elements 11 roll along a raceway 1a formed on the rail 1 while being guided by the guide passage. In the process of the rolling elements rolling on the raceway 1a of the rail 1 in this manner, the bearing function is implemented to achieve smooth movement of the slider S.

As shown in FIG. 3, the end cap C has a lubricant supply hole 8 extending therethrough in the axis direction which is the moving direction of the slider S. The lubricant supply hole 8 includes a hole 8a facing the slider S and a hole 8b having an inner diameter greater than that of the hole 8a and located on the side of the hole 8a opposite to the slider S. Such a lubricant supply hole 8 is fluidly connected to the rolling-element directing passage 7 in the end cap C.

The seal body H has a seal lip Ha. The seal lip Ha is provided on the outer side of the end of the end cap C, that is, on the face opposite to the contact face of the end cap C with slider S, and is in contact with the track surface of the rail. The seal body H having the seal lip Ha has a tubular protrusion 9 protruding from its side face facing the end cap C.

The tubular protrusion 9 has an insertion portion 9a formed therein for receiving the lubricant supply nozzle 10 inserted therein and a supply port 9b formed in the bottom of the insertion portion 9a for supplying lubricant.

The tubular protrusion 9 has an outer diameter smaller than the inner diameter of the hole 8b of the lubricant supply hole 8, and the inner surface of the insertion portion 9a is tapered inward. The taper formed in the insertion portion 9a has a taper angle smaller than that of a tapered portion 10a formed at the leading end of the lubricant supply nozzle 10, so that, when the lubricant supply nozzle 10 is inserted into the insertion portion 9a, the periphery of the tapered portion 10a comes into close contact with the inner surface of the insertion portion 9a.

The taper angle of the insertion portion 9a may be designed to exactly conform to that of the tapered portion 10a of the lubricant supply nozzle 10. In short, what is required is that, when the tapered portion 10a of the lubricant supply nozzle 10 is inserted into the insertion portion 9a, the tapered portion 10a forms a seal element making close contact with the inner surface of the insertion portion 9a.

In the embodiment as described above, when the seal body H is mounted on the end cap C, the tubular protrusion 9 is inserted into the hole 8b of the lubricant supply hole 8. Because of such insertion of the tubular protrusion 9 into the hole 8, the tubular protrusion 9 does not protrude in the moving direction of the slider S. Accordingly, the tubular protrusion 9 does not cause any restriction of the stroke of the slider S.

After the seal body H has been mounted on the end cap C, the tapered portion 10a of the lubricant supply nozzle 10 is inserted into the insertion portion 9a of the tubular protrusion 9. At this stage, the lubricant supply nozzle 10 is inserted into the insertion portion 9a until the tapered portion 10a comes into contact with the inner surface of the insertion portion 9a. In other words, the lubricant supply nozzle 10 is pressed into the insertion portion 9a until the seal element is formed.

If the lubricant is supplied from the lubricant supply nozzle after the tapered portion 10a has made contact with the inner surface of the insertion portion 9a in this manner, even when the pressure of the supplied lubricant is increased somewhat, all the supplied lubricant is supplied from the supply port 9a into the rolling-element directing passage 7 without leakage of the lubricant from the seal element formed by the close contact between the insertion portion 9a and the tapered portion 10a. As a result, the lubricant can lubricate the rolling elements guided into the rolling-element directing passage 7.

In the embodiment, since the outer diameter of the tubular protrusion 9 is designed to be smaller than the inner diameter of the hole 8b of the lubricant supply hole 8, the tubular protrusion 9 can expand outward within the hole 8b of the lubricant supply hole 8. Since the tubular protrusion 9 can expand outward within the hole 8b in this manner, for example, even if the lubricant supply nozzle 10 is inserted at an angle with respect to the insertion portion 9a of the tubular protrusion 9, the tubular protrusion 9 can be expanded outward while the leading end of the lubricant supply nozzle 10 strongly presses against the inner side of the insertion portion 9a. In other words, even if the lubricant supply nozzle 10 is inserted at an angle with respect to the insertion portion 9a, the supply of lubricant is not affected.

In any case, in the embodiment, even if the supply port 9b of the tubular protrusion 9 is greatly reduced in size, the lubricant supplied to the insertion portion 9a does not escape from the seal element to the outside. In consequence, a reduction in size of the supply port 9b to the extent that the intrusion of foreign substances is prevented is achieved, so that foreign substances do not intrude even while the supply port 9b remains open.

The embodiment describes the case in which the insertion portion 9a and the tapered portion 10a of the lubricant supply nozzle 10 are made close contact with each other in order to form the seal element according to the present invention. As another manner, a ring shaped ridge can be provided on the inner periphery of the insertion portion 9a to form the seal element according to the present invention.

In the embodiment the supply port 9b formed in the bottom of the insertion portion 9a is designed to be a small hole, but it may alternatively have a slit shape. In the case when the supply port 9b is formed in a slit shape, the supply port 9b is structured to close regularly, and open when being acted upon by the pressure of the lubricant. This design makes it possible to prevent the intrusion of ordinary foreign substances.

The linear motion guide unit described in the embodiment is of a type in which the slider S is moved while the drive shaft 5 is rotated by the electric motor 6. However, the present invention can apply to any type of linear motion guide units with sealing structure for preventing the intrusion of foreign substances on the guide passage of the rail 1 into the slider S.

The side seal according to the present invention is suitable for use in linear motion guide units.

REFERENCE SIGNS LIST

S Slider
C End cap
H Seal body
Ha Seal Lip
7 Rolling-element directing passage
8 Lubricant supply port
8a Hole
8b Hole
9 Tubular protrusion
9a Insertion portion
9b Supply port
10 Lubricant supply nozzle
10a Tapered portion (of the lubricant supply nozzle)

What is claimed is:

1. A side seal for a linear motion guide unit, comprising
a seal body that is mounted on an outer side of an end cap mounted on each of the opposite ends of a slider and has a supply port formed therein for a supply of lubricant to a rolling-element directing passage formed in the end cap, and
a tubular protrusion that is provided on a side face of the seal body facing the end cap, maintains a positional relationship of being inserted into a lubricant supply hole formed in the end cap when the side face of the seal body faces a side face of the end cap, and comprises an insertion portion receiving insertion of a lubricant supply nozzle used for a supply of lubricant, and a supply port connected to the rolling-element directing passage through the lubricant supply hole in a condition in which the tubular protrusion is inserted in the lubricant supply hole, and
a seal element created on the insertion portion and making close contact with an outer periphery of the lubricant supply nozzle a process of inserting the lubricant supply nozzle into the insertion portion.

2. The side seal for a linear motion guide unit according to claim 1, wherein the insertion portion of the tubular protrusion into which the lubricant supply nozzle is inserted has an inner diameter tapered from an end of the insertion portion opposite to a contact face with the slider toward the lubricant supply hole.

3. The side seal for a linear motion guide unit according to claim 1, wherein the tubular protrusion has an outer diameter smaller than an inner diameter of a portion of the lubricant supply hole of the end cap into which the tubular protrusion is inserted, in order to create clearance.

4. The side seal for a linear motion guide unit according to claim 3, wherein the insertion portion of the tubular protrusion into which the lubricant supply nozzle is inserted has an inner diameter tapered from an end of the insertion portion opposite to a contact face with the slider toward the lubricant supply hole.

* * * * *